United States Patent [19]

Cobb

[11] 4,157,416
[45] Jun. 5, 1979

[54] COMPOSITE FOAM STRUCTURE

[75] Inventor: A. Lawrence Cobb, Rochester, Mich.

[73] Assignee: Composite Technology Corporation, Madison Heights, Mich.

[21] Appl. No.: 902,590

[22] Filed: May 4, 1978

[51] Int. Cl.² .............................................. B32B 3/26
[52] U.S. Cl. .................................... 428/311; 428/420
[58] Field of Search ...................... 428/311, 315, 420; 156/295, 313

[56] References Cited

U.S. PATENT DOCUMENTS

| 3,867,221 | 2/1975 | Chant | 428/311 |
|---|---|---|---|
| 3,944,704 | 3/1976 | Dirks | 428/311 |
| 4,034,137 | 5/1977 | Hofer | 428/311 |
| 4,042,746 | 8/1977 | Hofer | 428/311 |
| 4,042,751 | 8/1977 | Roth | 428/311 |
| 4,051,296 | 9/1977 | Windecker | 428/311 |

Primary Examiner—William J. Van Balen
Attorney, Agent, or Firm—Reising, Ethington, Barnard, Perry & Brooks

[57] ABSTRACT

A composite structure comprising a layer of initially resilient foam material having open and connected cells one portion of which is impregnated with a first polymerizable resin system and another portion of which is impregnated with a second polymerizable resin system and which resin systems are concurrently polymerized while maintaining the resilient foam layer under compression whereby each polymerized resin is disposed as a continuous and rigid resin phase throughout respectively adjacent portions of said foam material.

3 Claims, 8 Drawing Figures

COMPOSITE FOAM STRUCTURE

TECHNICAL FIELD

The subject matter of the invention relates to a laminated composite structure of the type wherein initially resilient and open-cell foam material with reinforcing outer layers is impregnated with two discrete polymerizable resin systems to provide an integral structure having the combined physical and chemical characteristics of the materials utilized. The invention is more specifically concerned with composites predominantly utilizing non-metallic materials such as high-strength glass fibers, open-cell, initially resilient foam and a plurality of compatible polymerizable resin systems for binding the materials together.

The composite structure of the present invention is generally of the type utilizing one or more layers of initially resilient foam material having open and connected cells and which foam material is impregnated with two discrete polymerizable resin systems such as polyesters or epoxys. Normally the uncured, resin-impregnated, foam material is overlaid with one or more reinforcing layers such as fiberglass elements after which the resin systems are polymerized while maintaining the composite under compression sufficient to greatly reduce the thickness of the foam material and to fill the open cells thereof as well as encapsulating the reinforcing elements with the respective resins.

Heretofore it has been assumed that only a single resin system could be employed in fabricating such a composite structure wherein the resin-impregnated foam is compressed to fill the foam cells and encapsulate the reinforcing fibers. Such single resin system has been heretofore selected on the basis of the most compelling need, such as material cost, surface finish, paint adhesion, bondability, tensile strength, or the like. Thus, if resin cost is a controlling factor or a particularly smooth finish is desired, a polyester resin system is likely to be chosen. On the other hand, if the composite requires superior paint adhesion, part bonding or higher tensile or laminar strength, then, an epoxy resin system is likely to be employed.

The present invention relates to a composite structure wherein the physical and chemical characteristics of two or more resin systems can be utilized and where, for example, a composite can be fabricated incorporating the characteristics of both polyester and epoxy resin systems.

BACKGROUND ART

Schafer U.S. Pat. Nos. 3,193,437 and 3,193,441 illustrate the concept of an initially resilient and open-cell foam material impregnated with a thermosetting resin used alone or in combination with reinforcing fibers, and wherein the foam layer is compressed under relatively low pressures such that the resin substantially fills the cells of the foam and which resin is cured while maintaining the resilient foam layer in a compressed condition. While in both Schafer patents it is stated that a polyester resin is preferred, it is also recognized that as an alternative epoxy or other resins may be used. Likewise, U.S. Pat. No. 3,867,221 Chant teaches that polyester or epoxy resins may be used as the binder in a foam-impregnated composite structure. U.S. Pat. No. 3,269,887 Windecker also teaches the alternative use of polyester or epoxy resins in fabricating a resin-impregnated foam composite.

Thus, the prior art has heretofore taught that in forming a resin-impregnated foam composite one must use a single resin binder system, e.g. either polyester or epoxy. There is no recognition in the prior art that at least two resin binder systems can be combined to yield a resultant composite structure having the desirable physical and chemical characteristics of each cured resin.

BEST MODE FOR CARRYING OUT THE INVENTION

Applicant has discovered that it is possible to utilize at least two distinct resin systems which can be concurrently cured or polymerized to produce a rigidified, foam-impregnated, composite structure having the desirable physical and chemical properties of each resin. More particularly, it has been found that such a composite can be formed while limiting the admixture or chemical reaction between the distinct resin systems to the interface area where the resin systems come together.

As a result of this discovery, it is possible with the present invention to produce a multi-resin-containing composite structure having physical and chemical properties not heretofore obtainable with a single resin system. By virtue of this invention it is also possible to form in a single compression and polymerizing operation such a composite structure without causing a general mixing of the discrete resin systems. Thus, even though each resin system is in liquid form and there is no physical barrier between the respective resin systems, there is no general mixing between the resin systems during the concurrent compression and polymerization or curing operation. Rather, even during compression each resin system remains essentially entirely within one portion of the foam material. At the same time, it is found that the resin systems mix and/or copolymerize only at or along an intermediate boundary layer formed during the concurrent compression and polymerization step.

By way of example, applicant has produced such a multi-resin composite structure having a discrete polymerized polyester resin layer in an adjacent and bonded relationship with a discrete polymerized epoxy resin layer. With such an integrally formed polyester/epoxy resin composite structure a distinct and very thin bonding layer may be observed at the interface of the adjacent and cured resin systems. Such thin bonding layer is particularly observable where the polyester and epoxy resin systems are similarly pigmented since the bonding layer tends to have a distinct coloration. Such distinct coloration of the thin bonding layer suggests a copolymerization along the area of contact of the two resin systems. Particularly where different types of resins, e.g., polyester and epoxy, are utilized, the limiting of the admixture of the resin systems is important in order to preserve the respective physical and chemical characteristics of each cured resin in the resultant composite structure. Furthermore, it is important to utilize resin systems which will bond or polymerize at the boundary layer to insure the required laminar strength of the cured composite structure.

The details of the invention will be more clearly understood by a perusal of the ensuing detailed description and illustrative drawings.

BRIEF DESCRIPTION OF DRAWINGS

A first embodiment of the invention is shown in FIGS. 1 through 4 of the drawings. FIG. 1 represents an exploded view of various solid components used in forming the composite and showing the parts prior to compression of the foam layers and polymerization of the resin systems. Members 10 and 12 are discrete layers of open-cell and initially resilient foam materials which may be formed of any suitable material such as polyurethane foam. In referring to the open-cell character of the resilient foam layers 10 and 12, it is meant that in general at least 85% of the foam cells are in open communication with adjacent cells. It has been found that a flexible or resilient polyurethane foam is highly satisfactory for practice with the subject invention. However, other open-cell resilient foams may be used so long as they are compatible with the polymerizable or thermosetting resin system with which each foam layer is to be impregnated.

Figure 1:
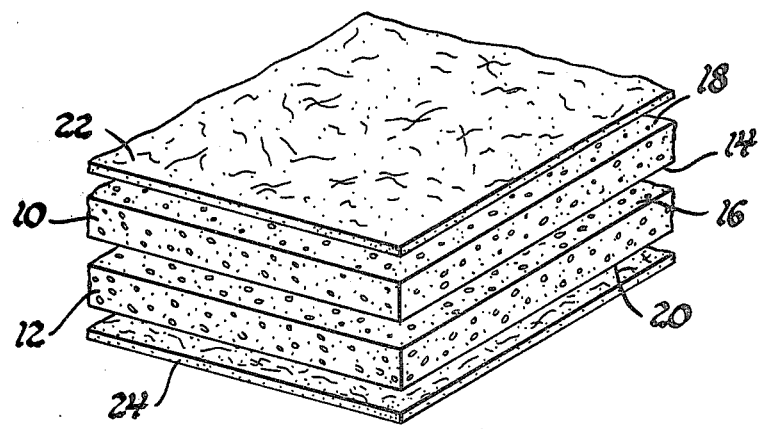
FIG. 1 is an exploded view of typical materials used and prior to compression and polymerization.

Foam layers 10 and 12 include inner walls or surfaces 14 and 16 adapted to be placed in overlaying and abutting relationship during the forming operation. The outer surfaces 18 and 20 of the discrete foam layers are, in turn, normally adapted to be overlaid with reinforcing layers 22 and 24. A preferred type of reinforcing material is comprised of glass fiber mats or woven cloth which adds substantial strength to the resultant composite structure.

Open-cell foam layers 10 and 12 are to be considered reservoirs for the liquid resin systems with which they are impregnated. The thickness of the open-cell layers 10 and 12 will generally be determined by the amount of resin necessary to impregnate the reinforcing layer and to fill the foam cells as well as the ultimate thickness desired in the resultant composite. In practice, it is common to use an open-cell resilient foam layer of one inch or less initial thickness and having a density of the range of 0.5 to 5 pounds per cubic foot.

Each open-cell foam layer 10 and 12 is preferably impregnated with a suitable resin system prior to being placed in overlaid and abutting relationship with each other. The resilient foam layers may best be impregnated in any well-known fashion such as dipping, being run through a resin bath and thereafter passed between squeezing rolls to control the amount of liquid resin retained within the foam layer, or gravure roll coated.

Whereas in the past it has been deemed possible to use only one type of resin system in the formation of such a composite structure, for example, vinyl ester, polyester, or epoxy resins, it is the purpose of the present invention to make such a composite utilizing at least two resin systems each having different resultant physical and/or chemical properties. As already noted, in the past it has been the practice to determine the most important characteristics required of a resin system and thereafter to use only such system even though it had other properties which were either undesirable or unnecessary in the resultant and composite structure. For example, if resin cost is a factor, it is common to use vinyl ester or polyester resin systems. If a very smooth surface finish is required, it is also common to use the polyester system. On the other hand, if paint adhesion to the composite surface or the bonding of composite parts together is an important factor, then, an epoxy resin system is normally utilized. Likewise, if high tensile or laminar strength is a requirement, again, an epoxy resin system is likely to be employed rather than a polyester system.

Figure 2:
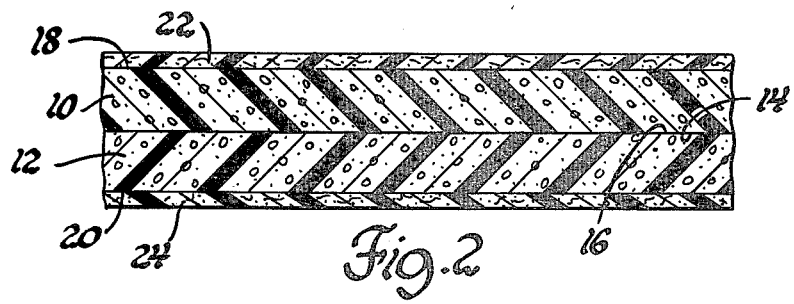
FIG. 2 is a sectional view showing the composite materials in overlaid relationship prior to compression and polymerization.

Referring now to the pre-polymerized composite structure depicted in FIG. 2, the first resilient open-cell foam layer 10 is impregnated with a first resin system, e.g. polyester, while the second open-cell foam layer 12 is impregnated with another resin system, e.g. epoxy. The thus impregnated foam layers are placed in overlaying and abutting relationship and the respective reinforcing layers 22 and 24 are placed over their outer surfaces 18 and 20. The uncured composite sandwich is next placed within a suitable mold or between a pair of platens. The sandwich is then placed under a compression load of preferably between 50 and 100 psi which reduces the thickness of the resin-impregnated resilient foam layers 10 and 12 to between 50% and 10% of their original thickness. In so compressing layers 10 and 12, the respective resins contained therein fill substantially all of the now flattened open cells while the excess resin is extruded outwardly and inwardly relative to the outer and inner surfaces of each discrete foam layer. In being extruded outwardly, the respective resins encapsulate the associated reinforcing layers 22 and 24. On the other hand and for reasons not completely understood, the inward movement or flow of the respective resin systems toward the abutting interfaces 14 and 16 of the foam layers stops at such interface and does not, or only very slightly, impregnate the opposite and abutting foam layer surface. Rather, each resin system appears to resist the intrusion of the other and the mixing of the resin systems is limited to the area of such interface.

Figure 3:
FIG. 3 is a sectional view of the multi-resin composite after compression and polymerization.
Figure 4:
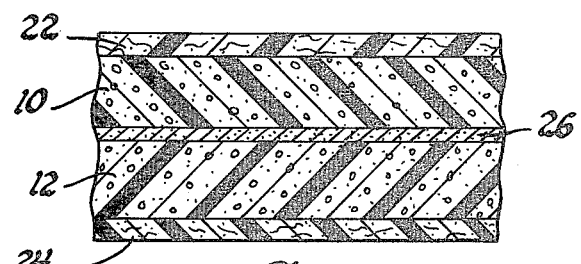
FIG. 4 is an enlarged view of the composite structure of FIG. 3.

Referring to FIGS. 3 and 4, it is assumed that a co-polymerization occurs between the resin systems at said interface resulting in a very thin bonding layer 26 composed of a resultant resin different from the resin systems found in the discrete foam layers 10 and 12. Particularly where both resin systems are of the same color, it is possible to observe the very thin bonding layer 26 at the mid-point or interface between the foam layers and which thin layer is of a slightly different color than the cured resins in each of the foam layers. It is possible, therefore, that such limited co-polymerization between the resin systems sets up a boundary layer which resists intrusion of the respective resin systems within the impregnated foam layers.

In any event, the resultant composite structure of FIGS. 3 and 4 presents a cured polyester resin portion on one side and a cured epoxy resin portion on the other side with a very thin co-polymer bonding layer therebetween. As a result of such combination, the cured composite structure incorporates the beneficial aspects of both types of resin systems.

While numerous compatible combinations are possible within the scope of the present invention, the following is an example of materials which may be combined to provide a high-strength, lightweight composite of the type shown in FIG. 3.

1. Foam layer
   Open-cell resilient polyurethane foam ½ inch thick with a density of 1.8 pounds per cubic foot.
2. Reinforcing layer
   Fiberglass mat with chopped or continuous fibers and having a weight of one ounce per square foot.
3. First resin system
   Epoxy resin system based on 828 (Shell) resin with an adducted diethylene triamene plus fillers and extenders as desired.
4. Second resin system
   Polyester resin system based on Hatco GR 13031 (87 parts) and a low profile additive such as Union Carbide LP 90 (13 parts), plus a peroxide catalyst and zinc stearate mold release.

Figure 5:
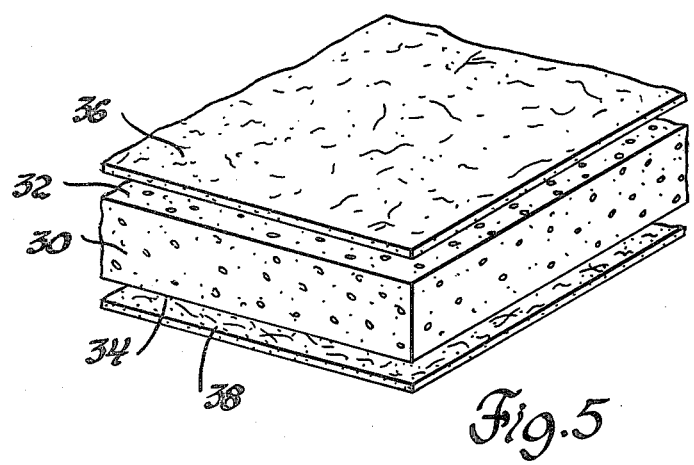
FIG. 5 is an exploded view of typical materials used in a second embodiment of the invention prior to compression and polymerization.
Figure 6:
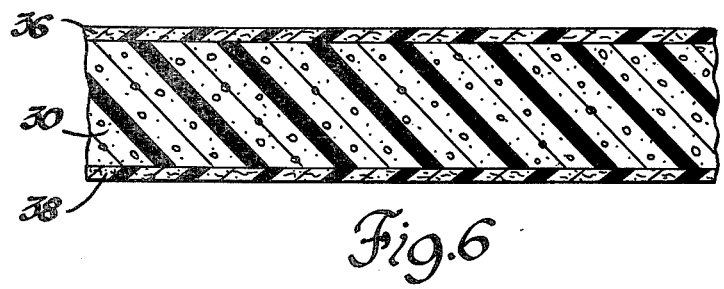
FIG. 6 is a sectional view of the composite materials of FIG. 5 in overlaid relationship prior to compression and polymerization.

Reference is now made to the embodiment of the invention shown in FIGS. 5 through 8. As seen in FIGS. 5 and 6, a single layer of resilient and open-cell foam is shown at 30 and includes transversely spaced outer surfaces 32 and 34. Reinforcing layers 36 and 38 are adapted to overlay outer surfaces 32 and 34 of foam material 30.

The foam material 30 and reinforcing layers 36 and 38 may be of the same types and construction as described with respect to the embodiment of FIGS. 1 through 4.

In the case of the embodiment of FIGS. 5 through 8, a predetermined quantity of the first uncured resin system, e.g., polyester, is spread over the entire surface 32 of the foam material 30 prior to the application of the reinforcing layer 36. Likewise, the second uncured resin system, e.g., epoxy, is spread over surface 34 of foam material 30 after which reinforcing layer 38 is applied thereto.

Figure 7:
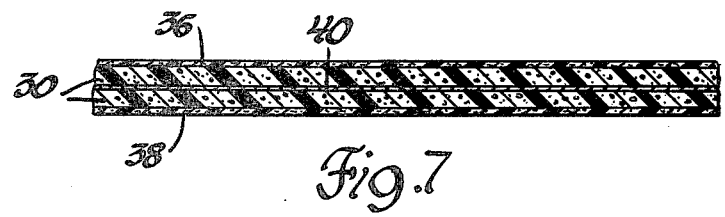
FIG. 7 is a sectional view of the composite of FIG. 6 after compression and polymerization.
Figure 8:
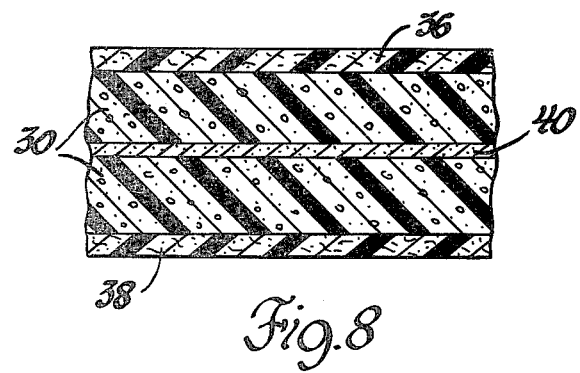
FIG. 8 is an enlarged view of FIG. 7.

With the materials in the overlaid condition shown in FIG. 6, the uncured and uncompressed composite is positioned within a mold or between platens following which the composite is compressed and polymerized to the form shown in FIGS. 7 and 8. Once again the foam material 30 is compressed to between 50% and 10% of its original thickness.

During the compression step the respective liquid and uncured resin systems flow into and fill the cells of those respective portions of foam material 30 between surfaces 32 and 34 and approximately the transverse mid-point of material 30 and as indicated by the thin band or layer 40. For reasons not completely understood and as noted with respect to the embodiment of FIGS. 1 through 4, the respective resin systems as they are extruded inwardly during the compression step do not flow past each other and thus are substantially contained in that portion, or approximately that half, of the foam material to which they were originally applied and from which the inward extrusion flow began.

As noted above, it has been discovered that the inward resin flow stops along a relatively thin boundary layer, e.g., 40, where the liquid resin systems come together. Further, while the major inward flow of the discrete resin systems stops where they meet within foam material 30, there is limited mixing or copolymerization to form the distinct intermediate boundary layer 40. Whether due to mixing or copolymerization of the two resin systems, such boundary is chemically distinguishable from the cured resins on either side thereof. At least in the case of where similarly lightly colored pigmented polyester and epoxy resins are used, boundary layer 40 has a distinct and darker coloration which suggests in such case that copolymerization occurs between the resin systems at such boundary layer.

The phenomenon of inward resin flow stoppage has been further demonstrated by repeating the forming procedure described above with respect to the embodiment of FIGS. 5 through 8 with the following modification. In this case, the same basic uncured resin system, e.g., polyester, is applied to each surface 32 and 34. However, one resin system has a dark, e.g., black, pigmentation added thereto while the other resin system has a light, e.g., white, pigmentation added thereto. The resultant compressed and cured composite graphically demonstrates that the inward flow of the pigmented resins stop where the resin systems come together, thereby producing a product approximately one-half of which is one color, e.g., black, and the other half of which is another color, e.g., white.

It is also contemplated within the scope of the present invention to utilize more than two layers of resin-impregnated foam. For example, it is possible to utilize three resin-impregnated foam layers wherein the outermost layers are impregnated with a polyester resin while the intermediate layer is impregnated with an epoxy resin. Likewise, it is possible to utilize three or more foam layers each impregnated with a different, though compatible, resin system.

Other modifications are possible within the intended scope of the hereinafter appended claims.

The embodiments of the present invention in which an exclusive property or privilege is claimed are defined as follows:

1. A composite structure comprising a layer of initially resilient foam material having open and connected cells, said foam layer including transversely spaced outer surfaces, first and second layers of high strength filaments respectively overlaying said outer surfaces, a first initially uncured, polymerizable resin system containing a light pigment impregnating the open cells of one portion of the foam layer, a second initially uncured, polymerizable resin system containing a dark pigment impregnating the open cells of another portion of the foam layer, the resin systems having been concurrently cured while maintaining the resilient foam material and the high strength filaments under compression, the first cured resin system providing a first rigidified polymerized resin extending throughout its associated compressed foam layer portion and the second cured resin system providing a second rigidified polymerized resin extending throughout its associated compressed foam layer portion, said first and second resin systems coming together to produce a product approximately one-half the thickness of which is the color of the light pigment and the other half of the thickness is the color of the dark pigment.

2. A composite structure comprising a layer of initially resilient foam material having open and connected cells, said foam layer including transversely spaced outer surfaces, first and second layers of high strength filaments respectively overlaying said outer surfaces, an initially uncured, thermosetting polyester resin system impregnating the open cells of one portion of said foam layer, an initially uncured, thermosetting epoxy resin system impregnating the open cells of another portion of said foam layer, the thermosetting resin systems having been concurrently cured while maintaining the resilient foam layer and the high strength filaments under compression, the cured polyester resin system providing a first rigidified resin phase extending throughout its associated compressed foam layer portion and the cured epoxy resin system providing a second rigidified resin phase extending throughout its associated compressed foam layer portion, said polyester and epoxy resin systems coacting during polymerization to form a third rigidified resin phase along a boundary layer intermediate the first and second rigidified polymerized resins.

3. A composite structure comprising two discrete layers of initially resilient foam material having open and connected cells, said foam layers being overlaid to provide abutting inner surfaces and transversely spaced outer surfaces, first and second layers of high strength filaments respectively overlaying said outer surfaces, an initially uncured, thermosetting polyester resin system impregnating the open cells of one layer, an initially uncured, thermosetting epoxy resin system impregnating the open cells of the other layer, the thermosetting resin systems having been concurrently cured while maintaining the layers of resilient foam and the high strength filaments under compression, the cured polyester resin system providing a first rigidified resin phase extending throughout its associated compressed foam layer and the cured epoxy resin system providing second rigidified resin phase extending throughout its associated compressed foam layer, said polyester and epoxy resin systems coacting during polymerization to form a third rigidified resin phase along the interface of said discrete foam layers.

* * * * *